United States Patent
Iida (10) Patent No.: US 9,298,635 B2
(45) Date of Patent: Mar. 29, 2016

(54) STORAGE DEVICE AND REBUILD PROCESS METHOD FOR STORAGE DEVICE

(75) Inventor: Takashi Iida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 162 days.

(21) Appl. No.: 13/805,377

(22) PCT Filed: Jun. 22, 2011

(86) PCT No.: PCT/JP2011/064278
§ 371 (c)(1),
(2), (4) Date: Dec. 19, 2012

(87) PCT Pub. No.: WO2012/005113
PCT Pub. Date: Jan. 12, 2012

(65) Prior Publication Data
US 2013/0097375 A1    Apr. 18, 2013

(30) Foreign Application Priority Data
Jul. 5, 2010    (JP) ................................ 2010-153194

(51) Int. Cl.
*G06F 12/08* (2006.01)
*G06F 11/14* (2006.01)
(Continued)

(52) U.S. Cl.
CPC ........ *G06F 12/0866* (2013.01); *G06F 11/1441* (2013.01); *G06F 11/1662* (2013.01);
(Continued)

(58) Field of Classification Search
CPC  G06F 3/06; G06F 11/1008; G06F 2211/1071
USPC ......................................... 711/113; 714/6.32
See application file for complete search history.

(56) References Cited

U.S. PATENT DOCUMENTS

2004/0221102 A1    11/2004  Watanabe
2006/0179209 A1*    8/2006  Wang et al. ................... 711/101
(Continued)

FOREIGN PATENT DOCUMENTS

JP    2000305717 A    11/2000
JP    2005011317 A     1/2005
(Continued)

OTHER PUBLICATIONS

Interview with Steve Pinder, RAID rebuilds: How do RAID rebuilds work and which is fastest?, ComputerWeekly.com, Jul. 2010.*
(Continued)

*Primary Examiner* — Adam M Queler
*Assistant Examiner* — Edmund Kwong (57) ABSTRACT

A storage device includes a plurality of magnetic disk devices each having a write cache, a processor unit that redundantly stores data, a rebuild execution control unit that performs a rebuild process, a write cache control unit that, at the time of the rebuild process, enables a write cache of a storage device that stores rebuilt data, and a rebuild progress management unit that is configured using a nonvolatile memory and manages progress information of the rebuild process. In the case where power discontinuity is caused during the rebuild process and then power is restored, the rebuild execution control unit calculates an address that is before an address of last written rebuilt data by an amount corresponding to the capacity of the write cache based on the progress information of the rebuild process managed by the progress management unit and resumes the rebuild process from that calculated address.

3 Claims, 6 Drawing Sheets

(51) Int. Cl.
*G06F 11/16* (2006.01)
*G06F 11/20* (2006.01)
*G06F 3/06* (2006.01)

(52) U.S. Cl.
CPC .......... *G06F11/2094* (2013.01); *G06F 3/0617* (2013.01); *G06F 3/0632* (2013.01); *G06F 3/0689* (2013.01); *G06F 2212/261* (2013.01); *G06F 2212/283* (2013.01)

(56) References Cited

U.S. PATENT DOCUMENTS

2007/0088990 A1* 4/2007 Schmitz ........................ 714/700
2007/0168706 A1* 7/2007 Humlicek ........................ 714/6
2008/0184070 A1* 7/2008 Chen ................................ 714/16
2010/0115197 A1* 5/2010 Lee et al. ...................... 711/113
2010/0125695 A1* 5/2010 Wu et al. ....................... 711/103

FOREIGN PATENT DOCUMENTS

JP  2005302225 A  10/2005
JP  2010128933 A  6/2010

OTHER PUBLICATIONS

The international search report for PCT/JP2011/064278 mailed on Aug. 9, 2011.

* cited by examiner

STORAGE DEVICE AND REBUILD PROCESS METHOD FOR STORAGE DEVICE

BACKGROUND

The present invention relates to a storage device that performs a rebuild process and a rebuild process method for a storage device.

A storage device in which a plurality of magnetic disk devices are used for redundant storage of data is known. In the case where one magnetic disk device has failed in such a storage device, a process of logically disconnecting that failed magnetic disk device is performed. Then, the storage device continues operation in a degraded state without redundancy using the remaining magnetic disk devices that have not failed.

In order to restore the storage device operating in the degraded state in this manner to a state with redundancy, a user needs to detach the failed magnetic disk device from the storage device and attach a new magnetic disk device to the storage device. When the new magnetic disk device is attached in this manner, the storage device executes a rebuild process of storing rebuilt data in the newly attached magnetic disk device. When the rebuild process is finished, the storage device is restored to a state with redundancy.

Also, a known example of disk array devices in which a plurality of magnetic disk devices are used for redundant storage of data increases the speed of writing data by enabling a write cache of a hard disk device with high disk access frequency (for example, see Patent Document 1).

Patent Document 1: Patent Publication JP-A-2000-305717

In a conventional storage device, the already-mentioned rebuild process is performed in parallel with a process relating to access to the magnetic disk device in normal usage. Therefore, there is a possibility that many writes to the newly attached magnetic disk device reduces the performance of a system including the storage device.

In order to prevent such a reduction in performance of the system, it is conceivable to set in advance an interrupt rate of the rebuild process with respect to the process relating to access to the magnetic disk device in normal usage.

However, in the case where the interrupt rate of the rebuild process is set to be small, the performance of the system including the storage device is not reduced, but the execution time of the rebuild process becomes longer. Therefore, time in which the storage device operates in the degraded state becomes longer, and the possibility of a system breakdown due to occurrence of a failure of the new magnetic disk device becomes higher.

On the other hand, in the case where the interrupt rate of the rebuild process is set to be high, the execution time of the rebuild process becomes shorter, but the possibility that the performance of the system including the storage device is reduced becomes higher.

That is, with a method of setting the already-mentioned interrupt rate, problems of the reduction in performance of the system including the storage device and an increase in time of the rebuild process cannot be solved together.

Also, by applying a technique of Patent Document 1 to enable the write cache of a newly attached magnetic disk device, it is possible to increase the speed of writing to that magnetic disk device. Therefore, by utilizing the technique of Patent Document 1, it may seem that achieving an increase in the speed of the rebuild process without reducing the performance of the system including storage device is possible.

However, there is a risk of losing data on the write cache when a state of power discontinuity occurs in the storage device due to an unexpected fault during the rebuild process. In the case where the data on the write cache is lost in this manner, the storage device can no longer distinguish which address the rebuild process has been finished up to. Therefore, after power is restored, it is conceivable that there arises a need for the storage device to perform an inefficient process such as, for example, starting the rebuild process over.

SUMMARY

The present invention has been made in view of the circumstance described above, and an object thereof is to provide a storage device and a rebuild process method for a storage device with which the speed of a rebuild process can be increased without reducing the performance of a system including a storage device and an unexpected power discontinuity during the rebuild process can be dealt with.

In the present invention, a storage device includes a storage unit including a plurality of memory devices each having a write cache, a first control unit that redundantly stores data in the plurality of memory devices, a second control unit that performs a rebuild process of rebuilding the data, a write cache control unit that, at a time of the rebuild process, enables a write cache of a memory device that stores rebuilt data, and a progress management unit that is configured using a nonvolatile memory and manages, as progress information of the rebuild process, an address of rebuilt data for which rebuilding is completed and which is written in the write cache, wherein, in a case where power discontinuity is caused during the rebuild process and then power is restored, the second control unit calculates an address that is before an address of last written rebuilt data by an amount corresponding to a capacity of the write cache based on the progress information of the rebuild process managed by the progress management unit and resumes the rebuild process from that calculated address.

With the present invention, a storage device and a rebuild process method for a storage device that can increase the speed of a rebuild process without reducing the performance of a system including a storage device and deal with an unexpected power discontinuity during the rebuild process can be provided.

DETAILED DESCRIPTION

Each embodiment of the present invention will be described below with reference to the drawings.

First Embodiment

Figure 1:
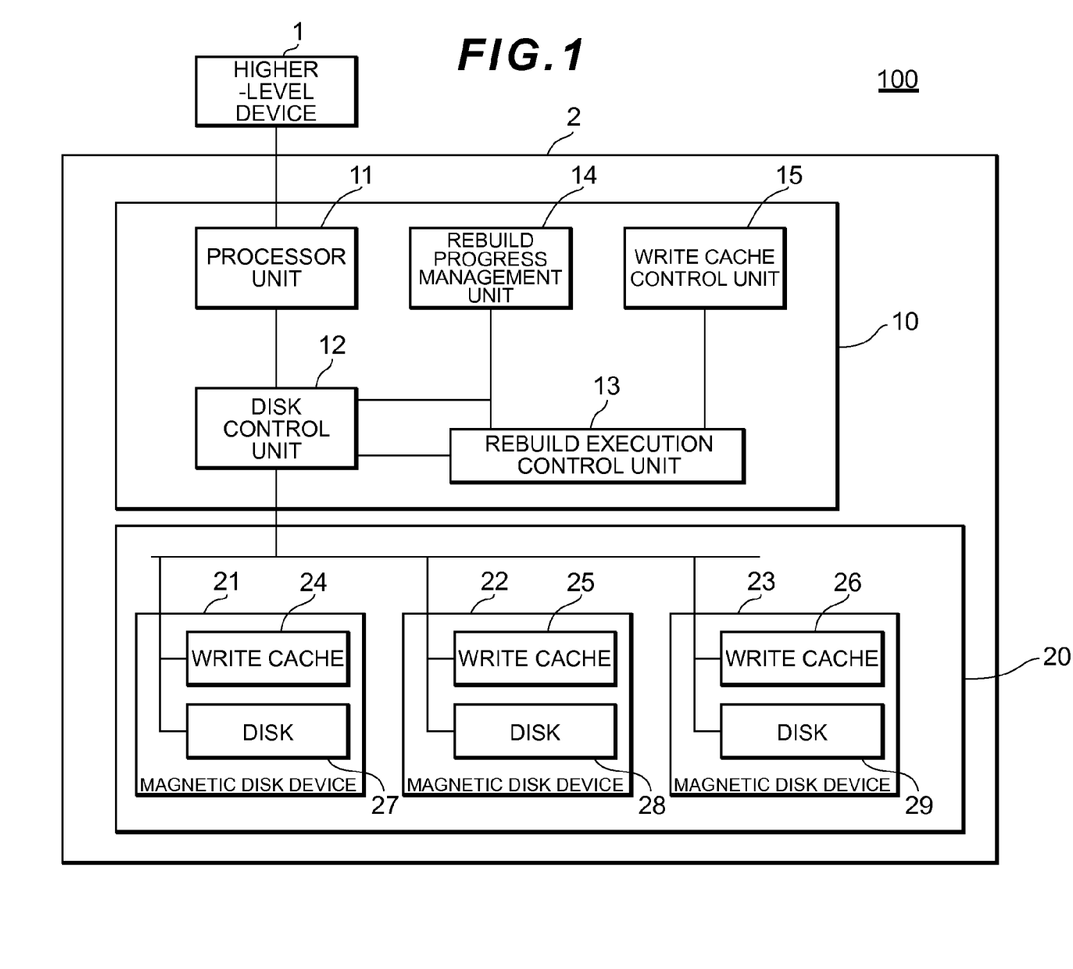
FIG. 1 is a block diagram showing the configuration of a storage system according to a first embodiment of the present invention.

FIG. 1 is a view schematically showing the configuration of a storage system 100. As shown in FIG. 1, the storage system 100 is configured of a higher-level device 1 and a storage device 2.

The higher-level device 1 transmits various commands such as a write command or a read command with respect to the storage device 2. Also, the higher-level device 1 receives read data and information on various statuses or the like from the storage device 2.

The storage device 2 executes a process based on the various commands received from the higher-level device 1. For example, in the case where a write command is received from the higher-level device 1, the storage device 2 stores data based on that write command. Also, for example, in the case where a read command is received from the higher-level device 1, the storage device 2 transmits data based on that read command to the higher-level device 1.

The storage device 2 is configured of a controller unit 10 and a disk unit 20 which is a storage unit.

The controller unit 10 includes a processor unit 11 which is a first control unit, a disk control unit 12, a rebuild execution control unit 13 which is a second control unit, a rebuild progress management unit 14 which is a progress management unit, and a write cache control unit 15. Also, the disk unit 20 includes magnetic disk devices 21, 22, and 23 which are memory devices. These magnetic disk devices 21, 22, and 23 respectively have write caches 24, 25, and 26 and disks 27, 28, and 29.

The processor unit 11 is connected to each of the higher-level device 1 and the disk control unit 12. Also, the disk control unit 12 is connected to each of the processor unit 11, the rebuild execution control unit 13, the rebuild progress management unit 14, and the magnetic disk devices 21, 22, and 23. The rebuild execution control unit 13 is connected to each of the disk control unit 12, the rebuild progress management unit 14, and the write cache control unit 15.

First, the disk unit 20 will be described.

The magnetic disk devices 21, 22, and 23 are devices that store data. In this first embodiment, RAID 5 is configured by the magnetic disk devices 21, 22, and 23. Thus, the magnetic disk devices 21, 22, and 23 can redundantly store write data transmitted from the higher-level device 1.

The write caches 24, 25, and 26 are caches that temporarily hold write data. The write caches 24, 25, and 26 are set to be enabled or disabled based on an instruction of the write cache control unit 15. Since the magnetic disk device in which the write cache is enabled can return a response to the disk control unit 12 when write data is held in the write cache, the speed of writing data can be increased.

The disks 27, 28, and 29 each store data.

Next, the controller unit 10 will be described.

The processor unit 11 interprets the various commands received from the higher-level device 1. Also, the processor unit 11 performs an operation instruction for the disk control unit 12 based on the interpreted command.

For example, in the case where a write command is received from the higher-level device 1, the processor unit 11 interprets that write command. Then, the processor unit 11 performs a control of redundantly storing data in the magnetic disk devices 21, 22, and 23 based on that interpreted write command.

Also, for example, in the case where a read command is received from the higher-level device 1, the processor unit 11 interprets that read command. Then, the processor unit 11 performs a control of reading data based on that interpreted read command from the magnetic disk devices 21, 22, and 23. The data read is transmitted to the higher-level device 1.

The writing of write data or the reading of read data described above are performed utilizing RAID information relating to RAID 5 already mentioned set in the magnetic disk devices 21, 22, and 23. A process of utilizing the RAID information is similar to a conventional one, and therefore description is omitted.

Upon receiving an instruction from the processor unit 11, the rebuild execution control unit 13, and the write cache control unit 15 via the rebuild execution control unit 13, the disk control unit 12 transmits a command based on that instruction with respect to the disk unit 20.

The rebuild execution control unit 13 executes a rebuild process with respect to the magnetic disk devices 21, 22, and 23. The rebuild process is performed when, in the case where a fault has occurred in one of the magnetic disk devices 21, 22, and 23 within the disk unit 20, the magnetic disk device in which that fault has occurred is replaced with a new magnetic disk device. When the new magnetic disk device is detected, the rebuild execution control unit 13 rebuilds data to be stored in the newly attached magnetic disk device for every predetermined data volume based on data stored in the other magnetic disk devices, and stores that rebuild data in that new magnetic disk device for every predetermined data volume.

Also, in the case where the storage device 2 is powered on after a state of power discontinuity, the rebuild execution control unit 13 calculates an address that is before an address of last written rebuilt data by an amount corresponding to the capacity of the write cache based on progress information (described later) of the rebuild process managed by the rebuild progress management unit 14, and performs a control of resuming the rebuild process from that calculated address.

Figure 2:
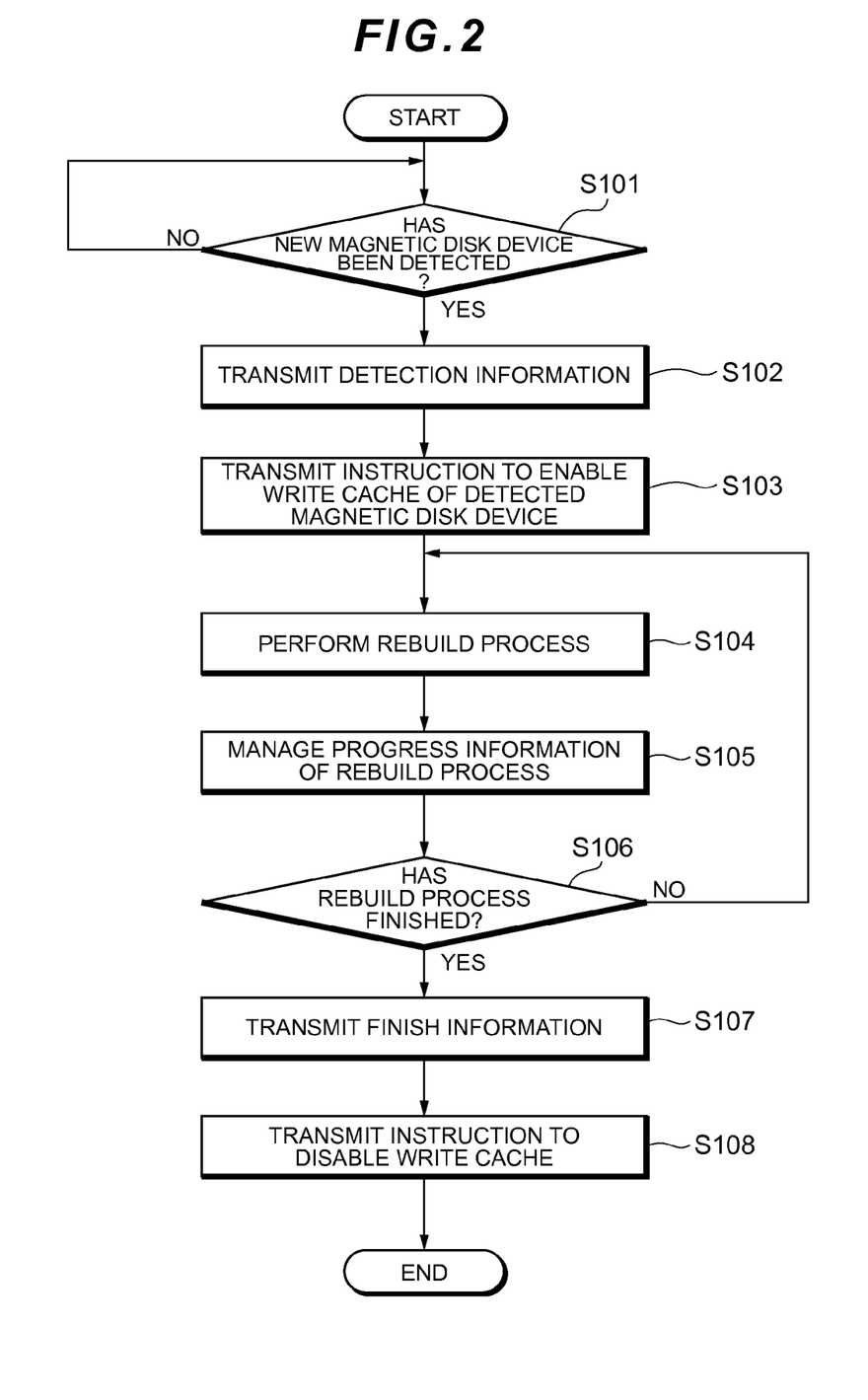
FIG. 2 is a flowchart showing a rebuild process according to the first embodiment.
Figure 3:
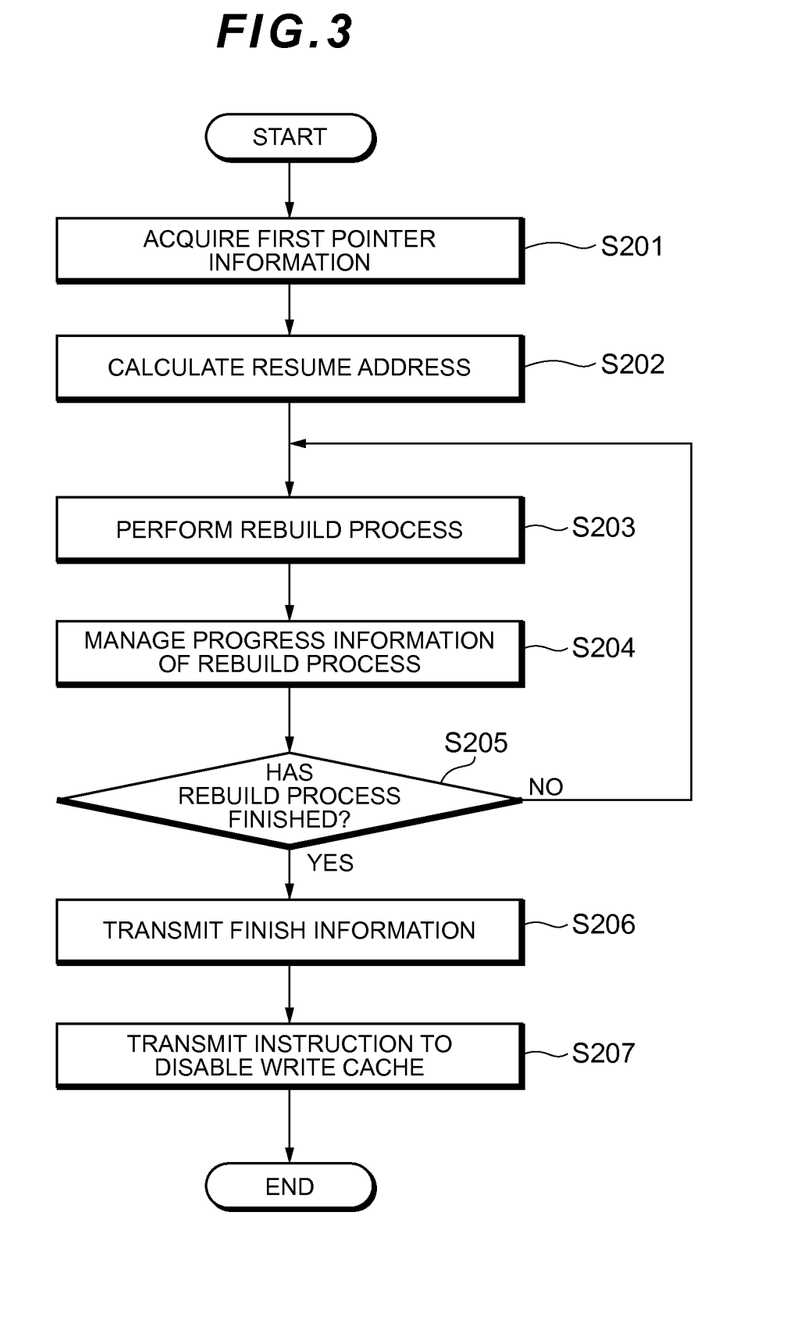
FIG. 3 is a flowchart showing a rebuild process after restoration of power according to the first embodiment.

Note that the details of the rebuild process will be described later with reference to FIG. 2, and the details of a process of resuming the rebuild process will be described later with reference to FIG. 3.

While the already-mentioned rebuild process is being executed, the rebuild progress management unit 14 manages the progress information of the rebuild process. The progress information is an address (hereinafter referred to as first pointer information) of data written in the write cache and for which the rebuild for every predetermined data volume has been completed. The rebuild progress management unit 14 is configured using a nonvolatile memory. Therefore, the first pointer information is held in the rebuild progress management unit 14 even if the state of power discontinuity is caused in the storage device 2.

The write cache control unit 15 performs a control to enable the write cache of the magnetic disk device that stores rebuilt data at the time of the rebuild process. Also, when the rebuild process is finished, a control of disabling the write cache of that magnetic disk device is performed. An instruction for the control of enabling or disabling the write cache is transmitted to the magnetic disk device that stores the rebuilt data from the write cache control unit 15 via the rebuild execution control unit 13 and the disk control unit 12.

Next, the rebuild process executed by the rebuild execution control unit 13 will be described with reference to FIG. 2.

The rebuild execution control unit 13 determines whether or not a new magnetic disk device has been detected within the disk unit 20 based on information from the disk control unit 12 (S101). A technique of determining whether or not a new magnetic disk device has been detected within the disk unit 20 is similar to a conventional one, and therefore a detailed description is omitted.

When it is not determined that a new magnetic disk device has been detected (S101: NO), the rebuild execution control unit 13 returns to a process of step S101.

On the other hand, when it is determined that a new magnetic disk device has been detected (S101: YES), the rebuild execution control unit 13 transmits detection information indicating that the new magnetic disk device has been detected to the write cache control unit 15 (S102). Upon receiving that detection information, the write cache control unit 15 transmits an instruction to enable the write cache of the newly detected magnetic disk device to the rebuild execution control unit 13.

Next, upon receiving the instruction to enable the write cache of the newly detected magnetic disk device from the write cache control unit 15, the rebuild execution control unit 13 transmits that instruction to the new magnetic disk device via the disk control unit 12 (S103). Accordingly, the write cache of that new magnetic disk device is enabled.

Next, the rebuild execution control unit 13 executes the rebuild process (S104). More specifically, the rebuild execution control unit 13 assumes the magnetic disk device other than the newly detected magnetic disk device as a source drive and the newly detected magnetic disk device as a target drive. Then, the rebuild execution control unit 13 reads data of a predetermined data volume from these source drives, rebuilds data from that read data, and stores that rebuilt data in the target drive.

The rebuild progress management unit 14 manages the progress information of the rebuild process executed by the rebuild execution control unit 13 (S105). That is, the rebuild progress management unit 14 updates the already-mentioned first pointer information every time writing of the rebuilt data of a predetermined data volume to the write cache is completed.

Next, the rebuild execution control unit 13 determines whether or not the rebuild process has finished (S106). In the case where it is determined that the rebuild process is not finished (S106: NO), the rebuild execution control unit 13 performs a process of step S104, and then the rebuild progress management unit 14 performs a process of step S105.

On the other hand, in the case where it is determined that the rebuild process has finished (S106: YES), the rebuild execution control unit 13 transmits finish information indicating that the rebuild process has finished to the write cache control unit 15 (S107). Upon receiving that finish information, the write cache control unit 15 transmits an instruction to disable the write cache of the newly detected magnetic disk device to the rebuild execution control unit 13.

Upon receiving the instruction to disable the write cache of the newly detected magnetic disk device from the write cache control unit 15, the rebuild execution control unit 13 transmits that instruction to the newly detected magnetic disk device via the disk control unit 12 (S108). Upon receiving that instruction, the newly detected magnetic disk device disables the write cache.

The rebuild process is executed in the above manner. After execution of the rebuild process, the storage device 2 is restored to a state with redundancy.

Next, a process of the rebuild execution control unit 13 in the case where power of the storage device 2 is restored after the state of power discontinuity is caused in the storage device 2 by an occurrence of a fault such as, for example, power outage during execution of the already-mentioned rebuild process will be described with reference to FIG. 3.

When the power is restored, the rebuild execution control unit 13 acquires the first pointer information managed by the rebuild progress management unit 14 (S201). The rebuild progress management unit 14 is configured of the nonvolatile memory. Therefore, the first pointer information is held in the rebuild progress management unit 14 even if power discontinuity is caused in the storage device 2.

Next, the rebuild execution control unit 13 calculates an address where the rebuild process is to be resumed (S202). More specifically, the rebuild execution control unit 13 calculates an address that is before an address indicated by the first pointer information acquired in step S201 by an amount corresponding to the capacity of the write cache. The calculated address becomes a resume address where the rebuild process is to be resumed.

Next, the rebuild execution control unit 13 executes the rebuild process or the like from the resume address calculated in step S202 (S203 to S207). Processes in steps S203 to S207 are respectively similar to the processes in steps S104 to S108 already mentioned with reference to FIG. 2, and therefore description is omitted.

Next, one example of the rebuild process will be described. The one example described below is of a case where the magnetic disk device 21 is detected as the new magnetic disk device.

When the magnetic disk device 21 is detected as the new magnetic disk device, the rebuild execution control unit 13 transmits the detection information to the write cache control unit 15. The write cache control unit 15 that has received the detection information transmits an instruction to enable the write cache 24 of the magnetic disk device 21. The instruction is transmitted to the magnetic disk device 21 via the rebuild execution control unit 13 and the disk control unit 12. Accordingly, the write cache 24 of that magnetic disk device 21 is enabled.

Next, the rebuild execution control unit 13 starts the rebuild process. First, the rebuild execution control unit 13 assumes the magnetic disk devices 22 and 23 as the source drive and the magnetic disk device 21 as the target drive. Then, the rebuild execution control unit 13 reads data stored in the disks 28 and 29 of the source drives only in a predetermined data volume. Then, the rebuild execution control unit 13 rebuilds data from the data read and stores that rebuilt data in the write cache 24 of the magnetic disk device 21. The rebuild execution control unit 13 repeats this process for every predetermined data volume.

In the rebuild process, the write cache 24 of the magnetic disk device 21 is enabled. Therefore, the rebuilt data is sequentially stored in the disk 27 after being held temporarily in the write cache 24. Thus, since the magnetic disk device 21 can return a response to the disk control unit 12 when the rebuilt data is held in the write cache 24, the magnetic disk device 21 can perform a process of storing data at high speed. Therefore, even if the rebuild process and a process relating to access in normal usage are performed simultaneously, a reduction in performance of the storage system 100 can be prevented.

Also, at the time of the rebuild process, the rebuild progress management unit 14 updates the first pointer information every time storing of the rebuilt data in the magnetic disk device 21 (i.e., writing to the write cache 24) is completed. Thus, which address in a storage area of the magnetic disk device 21 the rebuild process has been completed up to is managed by the rebuild progress management unit 14.

When the state of power discontinuity is caused in the storage device 2 during execution of the rebuild process, the operation of the controller unit 10 and the disk unit 20 stops. Thus, the rebuild process being executed by the rebuild execution control unit 13 also stops.

At this time, among the already-mentioned rebuilt data stored in the magnetic disk device 21, data stored in the disk 27 of the magnetic disk device 21 is not lost. However, among that data, data held in the write cache 24 is lost.

On the other hand, the rebuild progress management unit 14 is configured of the nonvolatile memory. Therefore, the first pointer information is held in the rebuild progress management unit 14 even if the state of power discontinuity is caused in the storage device 2.

When the state of power discontinuity is resolved and the power of the storage device 2 is restored, the rebuild execution control unit 13 acquires the first pointer information held by the rebuild progress management unit 14. Subsequently, the rebuild execution control unit 13 calculates the resume address that is before the address indicated by that first pointer information by an amount corresponding to the capacity of the write cache 24, and resumes the rebuild process from that calculated resume address.

The rebuild execution control unit 13 resumes the rebuild process from the address that is before the address indicated by the first pointer information by an amount corresponding to the capacity of the write cache 24. Therefore, even if the state of power discontinuity is caused in the storage device 2 and the rebuilt data is lost from the write cache 24, a trouble does not occur in the rebuild process. For example, a need for the storage device 2 to perform an inefficient process such as starting the rebuild process over does not arise.

Note that, in the case where data based on access in normal usage is held in the write cache 24 when the state of power discontinuity is caused in the storage device 2, that data is also lost in a similar manner to the rebuilt data. However, the lost data can be rebuilt from data stored in the disk 28 of the magnetic disk device 22 and the disk 29 of the magnetic disk device 23.

The storage device 2 in this first embodiment can perform the rebuild process with the write cache 24 of the magnetic disk device 21 being enabled. Therefore, the speed of the rebuild process can be increased without reducing the performance in a process of the storage device 2.

Also, in the above manner, the storage device 2 can increase the speed of the rebuild process. Therefore, time in which the storage device 2 operates in a degraded state can be shortened. As a result, the storage device 2 can reduce the possibility of a system breakdown due to a failure of the second magnetic disk device at the time of operation in the degraded state.

Further, the storage device 2 can resume the rebuild process from the address that is before the address indicated by the first pointer information managed by the rebuild progress management unit 14 by the amount corresponding to the capacity of the write cache 24 at the time of power restoration. Therefore, a situation where data on the write cache 24 is lost due to power discontinuity of the storage device 2 can be dealt with.

Second Embodiment

Figure 4:
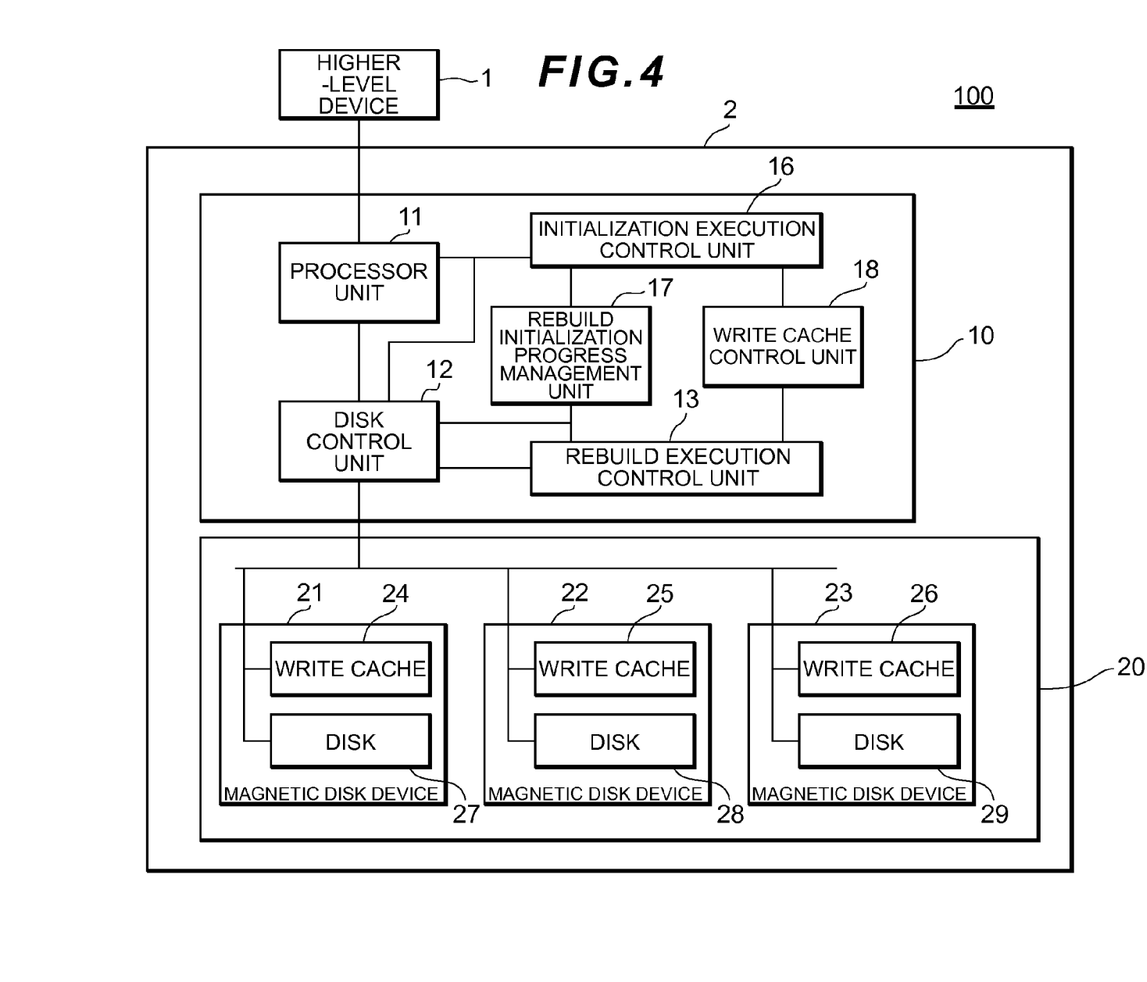
FIG. 4 is a block diagram showing the configuration of a storage system according to a second embodiment of the present invention.

Next, a second embodiment will be described. This second embodiment differs from the first embodiment in that an initialization execution control unit 16 which is a third control unit is added and a rebuild initialization progress management unit 17 in place of the rebuild progress management unit 14 and a write cache control unit 18 in place of the write cache control unit 15 are provided to a controller unit 2 of the first embodiment. Note that other components are the same as in the first embodiment. Therefore, the same components are denoted by the same reference numerals, and detailed descriptions are omitted for similar points as in the first embodiment.

As shown in FIG. 4, the initialization execution control unit 16 is connected with each of the processor unit 11, the disk control unit 12, the rebuild initialization progress management unit 17, and the write cache control unit 18. The rebuild initialization progress management unit 17 is connected to each of the disk control unit 12, the rebuild execution control unit 13, and the initialization execution control unit 16. The write cache control unit 18 is connected to each of the rebuild execution control unit 13 and the initialization execution control unit 16.

The initialization execution control unit 16 executes an initialization process of the magnetic disk devices 21, 22, and 23. More specifically, upon receiving an initialization command from the higher-level device 1 via the processor unit 11, the initialization execution control unit 16 sequentially initializes the magnetic disk devices 21, 22, and 23. Herein, initialization refers to overwriting of fixed data in a predetermined data volume to the magnetic disk devices 21, 22, and 23.

Also, in the case where the storage device 2 is powered on after a state of power discontinuity, the initialization execution control unit 16 calculates an address that is before an address of last written fixed data by an amount corresponding to the capacity of the write cache based on progress information (described later) of the initialization process managed by the rebuild initialization progress management unit 17, and performs a control of resuming the initialization process from that calculated address.

Figure 5:
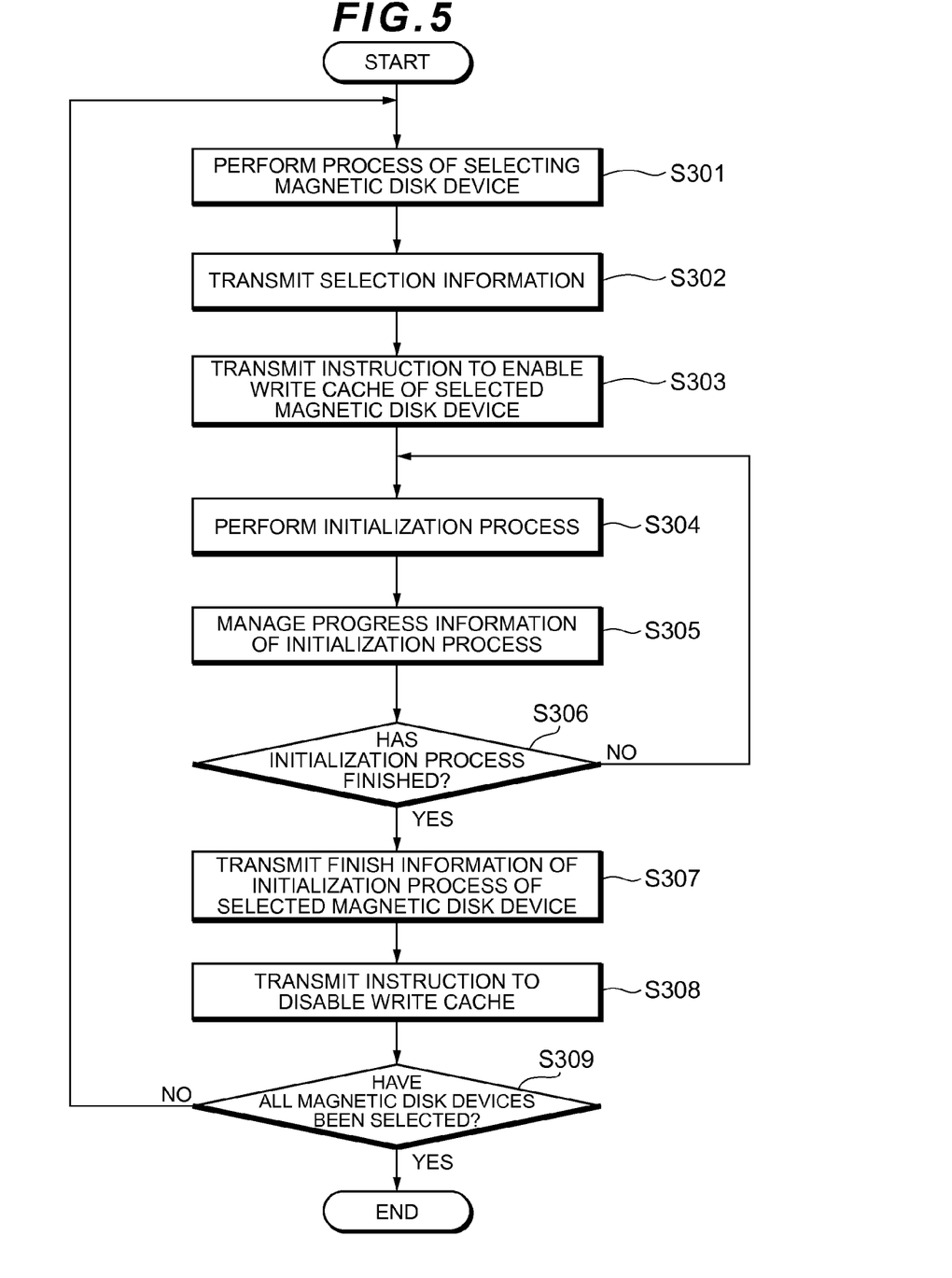
FIG. 5 is a flowchart showing an initialization process according to the second embodiment.
Figure 6:
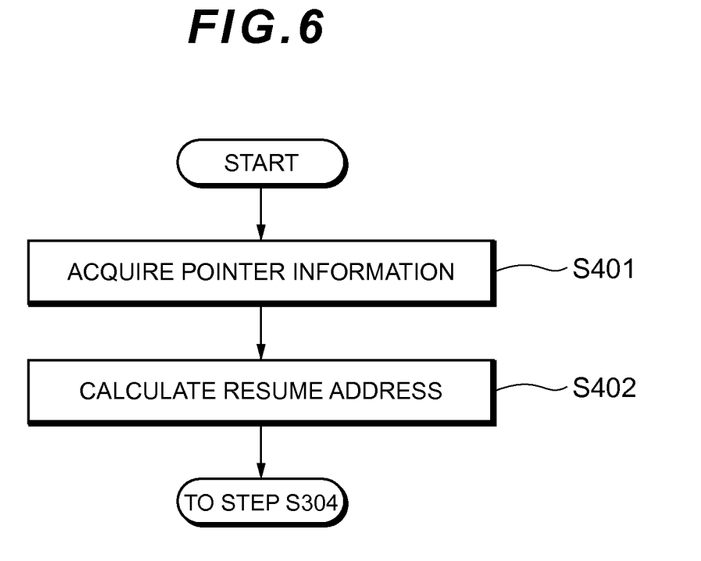
FIG. 6 is a flowchart showing an initialization process after restoration of power according to the second embodiment.

Note that the details of the initialization process will be described later with reference to FIG. 5, and the details of a process of resuming the initialization process will be described later with reference to FIG. 6.

The rebuild initialization progress management unit 17 manages the progress information of the rebuild process at the time when the rebuild execution control unit 13 executes the rebuild process. Also, the rebuild initialization progress management unit 17 manages the progress information of the initialization process at the time when the initialization execution control unit 16 executes the initialization process. Note that the management of the progress information at the time of the rebuild process is similar as in the description in the first embodiment, and therefore description is omitted.

While the already-mentioned initialization process is being executed, the rebuild initialization progress management unit 17 manages the progress information of the initialization process. The progress information is an address (hereinafter referred to as second pointer information) of fixed data written in the write cache. The rebuild progress management unit 17 is configured using a nonvolatile memory. Therefore, the second pointer information is held in the rebuild initialization progress management unit 17 even if the state of power discontinuity is caused in the storage device 2.

At the time when the rebuild execution control unit 13 executes the rebuild process, the write cache control unit 18 performs a control to enable or disable the write cache as described in the first embodiment. Also, at the time when the initialization execution control unit 16 executes the initialization process, the write cache control unit 18 performs a control to enable the write cache of the magnetic disk device for which the initialization is performed. Further, the write cache control unit 18 performs a control to disable the write cache of that magnetic disk device for which the initialization has been performed.

Next, the initialization process in which the magnetic disk devices 21, 22, and 23 of the disk unit 20 are sequentially initialized will be described with reference to FIG. 5. When the initialization execution control unit 16 receives an instruction for the initialization process from the higher-level device 1 via the processor unit 11, the initialization execution control unit 16 starts the initialization process.

The initialization execution control unit 16 performs a process of selecting the magnetic disk device 21, 22, or 23 (S301). In this second embodiment, the magnetic disk devices are initialized in the order of the magnetic disk devices 21, 22, and 23. Therefore, the magnetic disk devices 21, 22, and 23 are selected in this order.

When the magnetic disk device is selected, the initialization execution control unit 16 transmits selection information indicating the selected magnetic disk device to the write cache control unit 18 (S302). Upon receiving that selection information, the write cache control unit 18 transmits an instruction to enable the write cache of the selected magnetic disk device for which initialization is performed to the initialization execution control unit 16.

Upon receiving the instruction to enable the write cache of the magnetic disk device for which initialization is performed from the write cache control unit 18, the initialization execution control unit 16 transmits that instruction to the magnetic disk device for which initialization is performed via the disk control unit 12 (S303). Accordingly, the write cache of that magnetic disk device for which initialization is performed is enabled.

Next, the initialization execution control unit 16 executes the initialization process (S304). More specifically, the initialization execution control unit 16 performs a process of overwriting fixed data in the disk of the magnetic disk device for which initialization is performed.

The rebuild initialization progress management unit 17 manages the progress information of the initialization process (S305). That is, the rebuild initialization progress management unit 17 updates the already-mentioned second pointer information every time an overwriting process of fixed data is finished.

Next, the initialization execution control unit 16 determines whether or not the initialization process has finished (S306). In the case where it is determined that the initialization process is not finished (S306: NO), the initialization execution control unit 16 performs a process of step S304, and then the rebuild initialization progress management unit 17 performs a process of step S305.

On the other hand, in the case where it is determined that the initialization process has finished (S306: YES), the initialization execution control unit 16 transmits finish information indicating that the initialization process for the selected magnetic disk devices has finished to the write cache control unit 18 (S307). Upon receiving that finish information, the write cache control unit 18 transmits an instruction to disable the write cache of that magnetic disk device to the initialization execution control unit 16.

Upon receiving the instruction to disable the write cache of that magnetic disk device from the write cache control unit 18, the initialization execution control unit 16 transmits that instruction to that magnetic disk device via the disk control unit 12 (S308). Accordingly, the write cache of that magnetic disk device for which the initialization process has finished is disabled.

Next, the initialization execution control unit 16 determines whether or not all of the magnetic disk devices have been selected (S309). More specifically, the initialization execution control unit 16 selects each of the magnetic disk devices 21, 22, and 23 and determines whether or not the initialization process for all of the magnetic disk devices 21, 22, and 23 has finished.

In the case where it is determined that not all of the magnetic disk devices have been selected (S309: NO), the initialization execution control unit 16 repeats processes from step S301 to S308. That is, the initialization execution control unit 16 performs the initialization process for the magnetic disk device selected next.

On the other hand, in the case where it is determined that all of the magnetic disk devices have been selected (S309: YES), the initialization execution control unit 16 terminates the initialization process.

Next, a process of the initialization execution control unit 16 when power of the storage device 2 is restored after the state of power discontinuity is caused in the storage device 2 by an occurrence of a fault such as, for example, power outage during execution of the already-mentioned initialization process will be described with reference to FIG. 6.

When the power is restored, the initialization execution control unit 16 acquires the second pointer information managed by the rebuild initialization progress management unit 17 (S401). The rebuild initialization progress management unit 17 is configured of the nonvolatile memory. Therefore, the second pointer information is held in the rebuild initialization progress management unit 17 even if power discontinuity is caused in the storage device 2.

Next, the initialization execution control unit 16 calculates a resume address where the initialization process is to be resumed (S402). More specifically, the initialization execution control unit 16 calculates an address that is before an address indicated by the second pointer information acquired in step S401 by an amount corresponding to the capacity of the write cache. The calculated address becomes the resume address where the initialization process is to be resumed.

When the resume address is calculated in step S402, the initialization execution control unit 16 proceeds to step S304 already mentioned and resumes the initialization process from that resume address. Subsequent processes in step S305 and thereafter are similar as in the description already given with reference to FIG. 5, and therefore a detailed description is omitted.

The storage device 2 in the second embodiment can enable the write cache of the magnetic disk device for which the initialization process is performed and therefore can increase the speed of the initialization process.

Also, even if power discontinuity is caused during the initialization process, the storage device 2 can resume the initialization process from the address that is before the address indicated by the second pointer information managed by the rebuild initialization progress management unit 17 by the amount corresponding to the capacity of the write cache at the time of power restoration. Therefore, even if data on the write cache is lost by the power discontinuity of the storage device 2, storage areas of all of the magnetic disk devices 21, 22, and 23 can reliably be initialized.

Note that, in the second embodiment described above, a case where the storage device 2 executes the initialization process in addition to the rebuild process has been described. However, a component that performs the rebuild process and a component that performs the initialization process may not be provided within the same storage device. In this case, the storage device that performs the initialization process includes a function relating to the initialization process described in the second embodiment.

(Note 1)

A storage device comprising:

a storage unit including a plurality of memory devices each having a write cache;

a first control unit that redundantly stores data in the plurality of memory devices;

a second control unit that performs a rebuild process of rebuilding the data;

a write cache control unit that, at a time of of the rebuild process, enables a write cache of a memory device that stores rebuilt data; and a progress management unit that is configured using a nonvolatile memory and manages, as progress information of the rebuild process, an address of rebuilt data for which rebuilding is completed and which is written in the write cache, wherein, in a case where power discontinuity is caused during the rebuild process and then power is restored, the second control unit calculates an address that is before an address of last written rebuilt data by an amount corresponding to a capacity of the write cache based on the progress information of the rebuild process managed by the progress management unit and resumes the rebuild process from that calculated address.

(Note 2)

The storage device according to note 1, further comprising a third control unit that writes fixed data in the plurality of memory devices to perform an initialization process, wherein the write cache control unit further enables a write cache of a memory device for which the initialization process is performed, the progress management unit further manages an address of fixed data written in the write cache as progress information of the initialization process, and in a case where power discontinuity is caused during the initialization process and then power is restored, the third control unit calculates an address that is before an address of last written fixed data by an amount corresponding to a capacity of the write cache based on the progress information of the initialization process managed by the progress management unit and resumes the initialization process from that calculated address.

(Note 3)

A rebuild process method for a storage device having a storage unit including a plurality of memory devices each having a write cache and a control unit that redundantly stores data in the plurality of memory devices, comprising:

enabling a write cache of a memory device that stores rebuilt data at a time of a rebuild process;

managing, as progress information of the rebuild process and through use of a nonvolatile memory, an address of rebuilt data for which rebuilding is completed and which is written in the write cache;

acquiring an address of last written rebuilt data based on the progress information of the rebuild process managed using the nonvolatile memory in a case where power discontinuity is caused during the rebuild process and then power is restored; and calculating an address that is before the acquired address by an amount corresponding to a capacity of the write cache; and resuming the rebuild process from that calculated address.

This application claims priority to Japanese Patent Application No. 2010-153194 filed on Jul. 5, 2010, the disclosure of which are hereby incorporated in its entirety.

The invention of the present application has been described above with reference to the embodiments. However, the invention of the present application is not limited to the embodiments described above. Various modifications understandable to a person skilled in the art may be made in the configuration of the invention of the present application or, specifically, within the scope of the invention of the present application.

The present invention is widely applicable to a storage device that performs a rebuild process and a rebuild process method for a storage device.

1 Higher-level device
2 Storage device
10 Controller unit
11 Processor unit
12 Disk control unit
13 Rebuild execution control unit
14 Rebuild progress management unit
15 Write cache control unit
16 Initialization execution control unit
17 Rebuild initialization progress management unit
18 Write cache control unit
20 Disk unit
21, 22, 23 Magnetic disk device
24, 25, 26 Write cache
27, 28, 29 Disk
100 Storage system

I claim:

1. A storage device comprising:

a storage unit including a plurality of memory devices each having a write cache;

a first control unit that redundantly stores data in the plurality of memory devices;

a second control unit that performs a rebuild process of rebuilding the data to be stored in a newly attached memory device based on data stored in the other memory devices when one of the memory devices is replaced with the new memory device;

a write cache control unit that, at a time of the rebuild process, enables a write cache of a memory device that stores rebuilt data; and a progress management unit implemented via a hardware processor that is configured to manage, by storing in a nonvolatile memory as progress information of the rebuild process, an address of rebuilt data which is written in the write cache, each time the rebuilt data is stored in the write cache, wherein, in a case where power discontinuity is caused during the rebuild process and then power is restored, the second control unit calculates an address that is a top address of the rebuilt data which is lost from the write cache by the power discontinuity based on the address of the rebuilt data which is last written in the write cache managed by the progress management unit and a capacity of the write cache, and resumes the rebuild process from the calculated top address.

2. The storage device according to claim 1, further comprising a third control unit that writes fixed data in the plurality of memory devices to perform an initialization process, wherein the write cache control unit further enables a write cache of a memory device for which the initialization process is performed, the progress management unit further manages, by storing in a nonvolatile memory, an address of fixed data written in the write cache as progress information of the initialization process, and in a case where power discontinuity is caused during the initialization process and then power is restored, the third control unit calculates an address that is before an address of last written fixed data by an amount corresponding to a capacity of the write cache based on the progress information of the initialization process managed by the progress management unit and resumes the initialization process from that calculated address.

3. A rebuild process method for a storage device having a storage unit including a plurality of memory devices each having a write cache and a control unit that redundantly stores data in the plurality of memory devices, the rebuild process method comprising:

rebuilding the data to be stored in a newly attached memory device based on data stored in the other memory devices when one of the memory devices is replaced with the new memory device;

enabling a write cache of a memory device that stores rebuilt data at a time of a rebuild process;

managing, as progress information of the rebuild process and through use of a nonvolatile memory, an address of rebuilt data which is written in the write cache, each time the rebuilt data is stored in the write cache;

acquiring an address of last written rebuilt data based on the address of the rebuilt data which is last written in the write cache managed using the nonvolatile memory and a capacity of the write cache in a case where power discontinuity is caused during the rebuild process and then power is restored; and calculating an address that is a top address of the rebuilt data which is lost from the write cache by the power discontinuity that is before the acquired address by an amount corresponding to a capacity of the write cache; and resuming the rebuild process from the calculated top address.

* * * * *